US006636891B1

United States Patent
LeClair et al.

(10) Patent No.: US 6,636,891 B1
(45) Date of Patent: Oct. 21, 2003

(54) METHODS AND APPARATUS FOR CONTROLLING AN INPUT OR OUTPUT DEVICE OVER THE INTERNET

(75) Inventors: Gregory A. LeClair, San Jose; Babulal J. Thummar, Milpitas, both of CA (US)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/187,193

(22) Filed: Nov. 6, 1998

(51) Int. Cl.$^7$ ............................................. G06F 15/16
(52) U.S. Cl. ................................... 709/208; 358/1.15
(58) Field of Search ................................. 709/202, 203, 709/223, 208; 358/1.15, 296, 500, 1.9, 1.16; 707/102

(56) References Cited

U.S. PATENT DOCUMENTS

5,220,674 A  *  6/1993  Morgan et al. ............. 709/223
5,276,879 A     1/1994  Barry et al.

(List continued on next page.)

FOREIGN PATENT DOCUMENTS

| EP | 0 854 415 | 7/1998 |
| EP | 0 872 792 | 10/1998 |
| EP | 0 886 206 | 12/1998 |
| JP | 50292240 | 11/1993 |
| JP | 10-275063 | 10/1998 |
| WO | WO99/18534 | 4/1999 |

OTHER PUBLICATIONS

"Lantech Ethernet Print Servers", available electronically at: http:www.net-shop.co.uk/technota/ps2a.htm, 1998, pp. 1–2.
"Axis Print Server for Windows", available electronically at: http://www.net-shop.co.uk/technota/nps150a.htm, p. 1.
"Axis MultiProtocol Ethernet Print Server", available electronically at: http://www.net-shop.co.uk/technota/nps50a.htm, 1998, pp. 1–4.

IBM Book Manager® Book Server, "IPDS Reference", Sections 1.1, 1.2, 1.3, 1.5, 2.0–2.3, B.1, B.0 available electronically at: http://ppdbooks.pok.ibm.com:80/cgi . . . mgr/bookmgr,cmd, 1987, 1996, 16 pages.

R.M. Alder, "Distributed Coordination Models for Client/Server Computing", IEEE Computer Society, vol. 28, No. 4, Apr. 1, 1995, pp. 14–22, XP000507856.

Larry L. Peterson, "A Yellow–Pages Services for a Local–Area Network", Computer Communications Review, Association for Computing Machinery, vol. 17, No. 5, Aug. 1, 1988, pp. 235–242, XP002061706.

*Primary Examiner*—Patrice Winder

(57) ABSTRACT

In a network having an initiator, a server, and an input/output (I/O) device remote from the initiator, the initiator transmits to the server a request containing the network location of data to be retrieved from an input device, such as a video camera, fax, or scanner, or output by an output device, such as a printer. Output requests are placed in a queue and scheduled for completion. When an output device is ready, the server retrieves the data from a network storage location different from the queue and transmits the data to the printer or output device for action. When an input device is ready, the server retrieves the data from the input device and transmits it to a network location based on the request. The server can also provide the initiator with status information about the request and the input or output device.

55 Claims, 10 Drawing Sheets

U.S. PATENT DOCUMENTS

| | | | |
|---|---|---|---|
| 5,287,194 A | * 2/1994 | Lobiondo | 358/296 |
| 5,307,490 A | 4/1994 | Davidson et al. | |
| 5,450,571 A | * 9/1995 | Rosekrans et al. | 395/500 |
| 5,535,222 A | 7/1996 | Le | |
| 5,566,278 A | 10/1996 | Patel et al. | |
| 5,602,974 A | * 2/1997 | Shaw et al. | 395/114 |
| 5,666,486 A | 9/1997 | Alfieri et al. | |
| 5,666,532 A | 9/1997 | Saks et al. | |
| 5,687,320 A | 11/1997 | Wiley et al. | |
| 5,689,642 A | 11/1997 | Harkins et al. | |
| 5,699,495 A | * 12/1997 | Snipp | 395/114 |
| 5,701,451 A | 12/1997 | Rogers et al. | |
| 5,822,507 A | 10/1998 | Uda et al. | |
| 5,898,821 A | * 4/1999 | Brandkamp | 395/109 |
| 5,898,823 A | * 4/1999 | Sorkin et al. | 358/1.15 |
| 5,933,580 A | 8/1999 | Uda et al. | 358/1.13 |
| 5,995,723 A | * 11/1999 | Sperry et al. | 395/114 |
| 6,020,973 A | * 2/2000 | Levine et al. | 358/1.15 |
| 6,085,227 A | * 7/2000 | Edlund et al. | 709/203 |
| 6,092,078 A | * 7/2000 | Adolfsson | 707/102 |
| 6,157,465 A | * 12/2000 | Suda et al. | 358/407 |
| 6,184,996 B1 | * 2/2001 | Gase | 358/1.15 |
| 6,219,151 B1 | * 4/2001 | Manglapus et al. | 358/1.15 |
| 6,240,456 B1 | * 5/2001 | Teng et al. | 709/230 |
| 6,289,371 B1 | * 9/2001 | Kumpf et al. | 709/203 |
| 6,373,585 B1 | * 4/2002 | Mastie et al. | 358/1.13 |
| 6,412,022 B1 | * 6/2002 | Kumpf et al. | 710/20 |

* cited by examiner

METHODS AND APPARATUS FOR CONTROLLING AN INPUT OR OUTPUT DEVICE OVER THE INTERNET

BACKGROUND OF THE INVENTION

This invention relates generally to methods and apparatus for transmitting data to, and receiving data from, an output or input device over a computer network.

The introduction of networks, such as LANs, WANs, and the Internet, has revolutionized the field of computing and, in particularly, the field of data transfer (i.e. inputting and outputting data) between devices. Early computer workstations included a personal computer electrically connected to input and output devices, such as printers, scanners, fax machines, and video cameras. Today, networks allow multiple computer workstations or personal computers (collectively called "clients") to share input or output devices.

To share resources across a network, the resources must be able to communicate using the same or compatible protocols. Conventional networks are organized as a series of layers, the numbers, names, contents, and function of which differ from network to network. In most conventional networks, however, each layer offers services to the higher layers while shielding those layers from the details of how the offered services are actually implemented. When machines communicate, the layers on each machine can communicate with an equivalent layer on other machines using the appropriate protocol for that layer. The protocols used by the layers of a system is referred to as a "protocol stack" and define the network environment. In an UNIX environment, for example, the Transmission Control Protocol/Internet Protocol (TCP/IP) protocol stack includes the transmission control protocol (TCP) and Internet protocol (IP). Server Message Block (SMB) is a protocol stack for passing information between network computers for processing by a device. The TCP/IP protocol stack is one of the most common protocols used on the Internet.

FIG. 1 shows a conventional printing system including multiple clients and a shared printing device. Clients 105, 110, and 115 are connected via network 118 to a shared server 120 and printer 135. Any of clients 105, 110, and 115 may use printer 135 via server 120. If client 105 wants to print, for example, it sends, or "pushes," a print job consisting of print commands and print data over network 118 to server 120. Server 120 stores the print job to a disk, queue, or "spool," 125 in server 120. As a print job percolates to the top of the print queue, print controller 130 reads the stored file from spool 125 and transmits the file to printer 135. Print controller 130 also sends commands to printer 135. In response, printer 135 processes the received file.

This conventional "push" technology has some limitations. In a conventional printing system, for example, clients transmit command information as well as a digital copy of the output file across the network to the server. The server 120 must therefore have sufficient disk space in the spool 124 to store the print jobs waiting to be printed. In networks with many clients, the server requires large amounts of costly disk space, and may delay accepting new jobs if the disk's spool has reached its maximum storage capacity. When the spool is full, the client may waste time querying the server and waiting for it to have sufficient space to receive the job. Furthermore, the client may be inoperable for other tasks until the server can process the job, which can be a significant period of time if the output file is very large.

Additionally, in a conventional configuration, access to printers by clients will frequently be determined by chance and can be unfair. When a server rejects print jobs because the spool is full, clients wishing to output to a device controlled by that server may not be accepted in a predetermined order, but may have to keep querying the server hoping that its request arrives before the those of other clients when the server becomes available.

Furthermore, network print servers that receive requests to print from clients on a variety of platforms require multiple protocols and are more difficult to implement and troubleshoot. A platform is any piece of hardware plus its software operating system. FIG. 2 illustrates a conventional print server 210 that receives print requests from clients 220, 240, and 250, each operating on a different platform. Client 230 may be an Apple Macintosh using the MacOS® operating system, client 240 may be a PC using the UNIX operating system, and client 250 may be a PC operating the Windows 95® operating system. A server that accepts print jobs from clients on different platforms requires multiple protocol stacks to interpret and output the print request. For example, as shown in FIG. 2, print server 210 must contain TCP/IP 214, SMB 216, and PAP (Printer Access Protocol) 212 protocol stacks to communicate with the various clients 230, 240, and 250 on the network A server that must be configured to use a multitude of protocols is very complex, requiring additional time and resources to develop, troubleshoot, and maintain.

In addition, many conventional methods of printing using a network server do not allow a client to receive information about some status conditions. For example, in a conventional setting, once the client sends a print job to the print server, the client can only query the printer server for the status of the print job (such as whether it is currently printing or place in the print queue), but not for the status of the output device (such as amount of paper left in tray, etc.). Those systems that do allow fall bidirectional querying of printer status require specific hardware or licensed software. For example, IBM Corporation offers its Intelligent Printer Data Stream (IPDS) product that purportedly contains a command set for querying a printer for status information. The printer, however, must support the IPDS printer interface that recognizes a set of specially designed command sets in the IPDS architecture.

SUMMARY OF THE INVENTION

Consistent with this invention, in a network comprising an initiator, a server, and an output device, a server receives from an initiator a request comprising a network storage location of data to be output using the output device. The server places the request in a queue and schedules an output action based on the request. When the scheduled action is ready to be implemented, the server retrieves the output data from the network storage location which is different from the queue. A computer-readable medium consistent with the present invention contains instructions for outputting data in a network corresponding to tasks executable by a computer and performed by the server.

Another method for receiving data from an input device in a network consistent with this invention comprises the following operations, performed by the server. The server receives from input job information from an input device. The server stores the input job information to an input queue. The server receives a request from an initiator to process data from the input device based on the input job information. The server retrieves data from the input device based on the request and transmits the data to a location based on the data destination information. A computer-readable medium consistent with the present invention contains instructions for retrieving data from an input device in a network corresponding to tasks executable by a computer and performed by the server.

A network printer consistent with the present invention comprises a print mechanism for outputting data provided by the initiator. The network printer also comprises a controller for receiving from the initiator a request comprising the network storage location of data to be printed, placing the request in a queue, and scheduling the data to be printed based on the request. When the data is scheduled to be printed, the server retrieves the data from a location different from the queue, and transmits the data to the print mechanism.

An apparatus for controlling data in a network consistent with the present invention comprises a memory having program instructions; and a processor configured to receive a request from an initiator to output data provided by the initiator using the output device, the request comprising a network storage location of data to be output; place the request in a queue; schedule an output action based on the request in the queue, and retrieve the output data from the network storage location based on the request when the scheduled action is ready to be implemented, wherein the network storage location of the output data is different from the queue.

A further apparatus for controlling data in a network comprises a memory having program instructions; and a processor configured to receive input job information from an input device; store the input job information to an input queue; receive a request from an initiator to process data from the input device based on the input job information; and retrieve data from the input device based on the input job information when the input device is available.

Consistent with the present invention, a data control system comprises an initiator that transmits a request comprising a network storage location of data provided by the initiator to be output using the output device. A server receives the request, places the request in a queue, and schedules an action based on the request. When the scheduled action is ready to be implemented, the server retrieves the data from the network storage location which is different from the queue. The server may also retrieve input job information from an input device and retrieve data from an input device based on the input job information when the input device is available.

A network output device in a network comprises an output mechanism; a memory having program instructions; and a processor configured to receive a request from an initiator to output data provided by the initiator using the output device, the request comprising a network storage location of data to be output; place the request in a queue; schedule an output action based on the request in the queue, and retrieve the output data from the network storage location based on the request when the scheduled action is ready to be implemented, wherein the network storage location of the output data is different from the queue.

A network input device comprises a data input mechanism; a memory having program instructions; and a processor configured to receive input job information from an input device; store the input job information to an input queue; receive a request from an initiator to process data from the input device based on the input job information; and retrieve data from the input device based on the input job information when the input device is available.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Systems and methods consistent with the present invention operate in a network environment that has a client acting as an initiator of a transaction, a server, and an I/O device. In general, an initiator requests a server to perform an input/output transaction and negotiates the specifics of the transaction with the server. When the request from the initiator is ready to be executed, the server retrieves, or "pulls," the data from one location and sends it to another.

One system and method consistent with the present invention uses the standard Web transfer protocol, HTTP. The HTTP protocol operates well over many different physical links and is a popular protocol for transferring various types of information between devices on a network. Implementation of the HTTP protocol reduces the need for the server to contain multiple protocol stacks for translating requests from initiators on different platforms. Reducing the number of protocol stacks in the server reduces complexity of the device thereby reducing development, testing, and troubleshooting time.

Reference will now be made in detail to implementations consistent with the principles of the present invention as illustrated in the accompanying drawings. Wherever possible, the same reference numbers will be used throughout the drawings and the following description to refer to the same or like parts.

A. Architecture

Systems and methods consistent with the present invention may be implemented using a variety of architectures that will be described in more detail below. In general, the systems will comprise an initiator, a server, and an I/O mechanism connected via a network. As will be described below, the I/O mechanism may be a "thin" device attached to the network, server, or client. A "thin" device is one that performs most I/O operations and stores most data on a server. The I/O mechanism may also be collocated in the same device as an additional server such as, for example, a conventional printer with embedded server.

Figure 1:
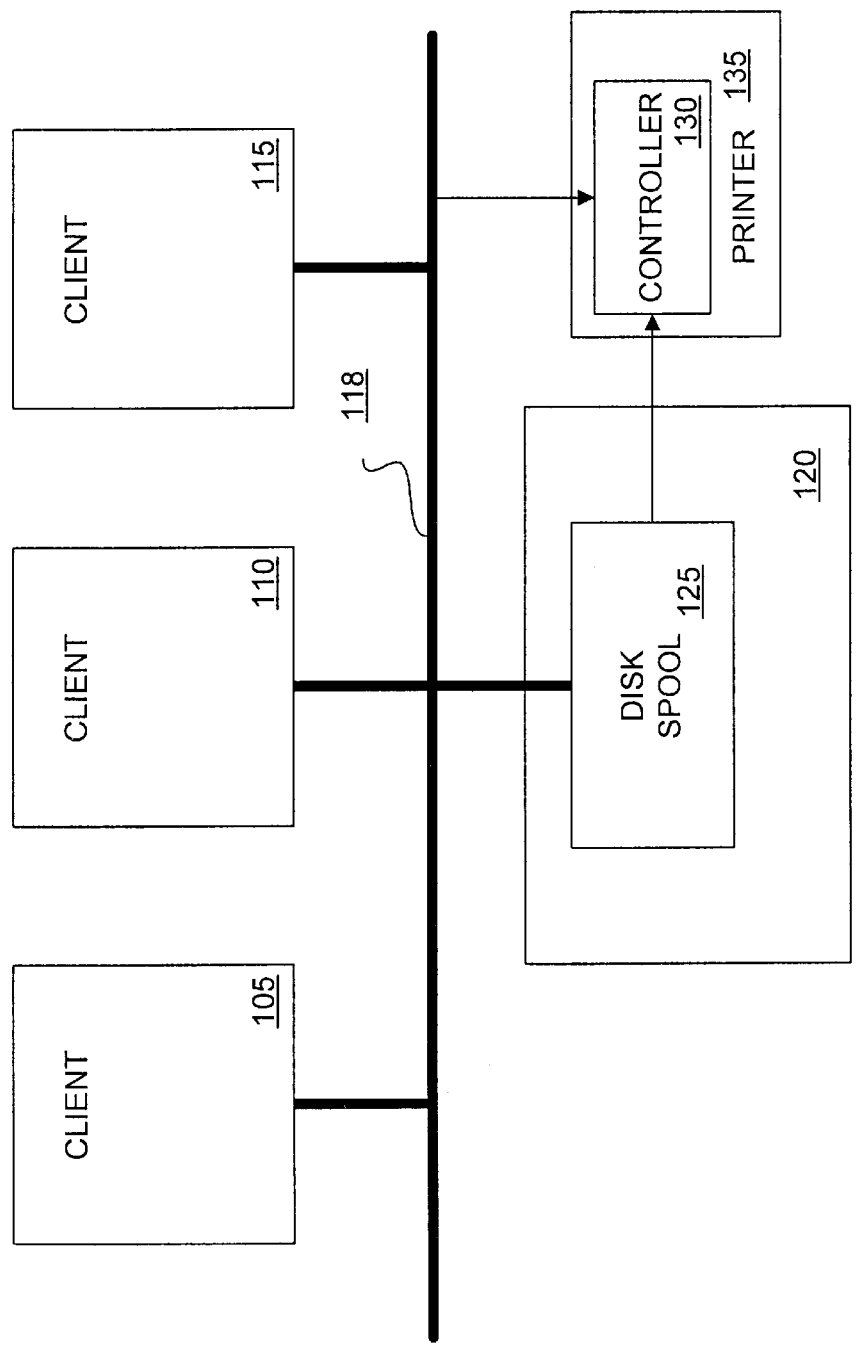
FIG. 1 is an illustration of a conventional network comprising clients, a printer, and a print server.
Figure 2:
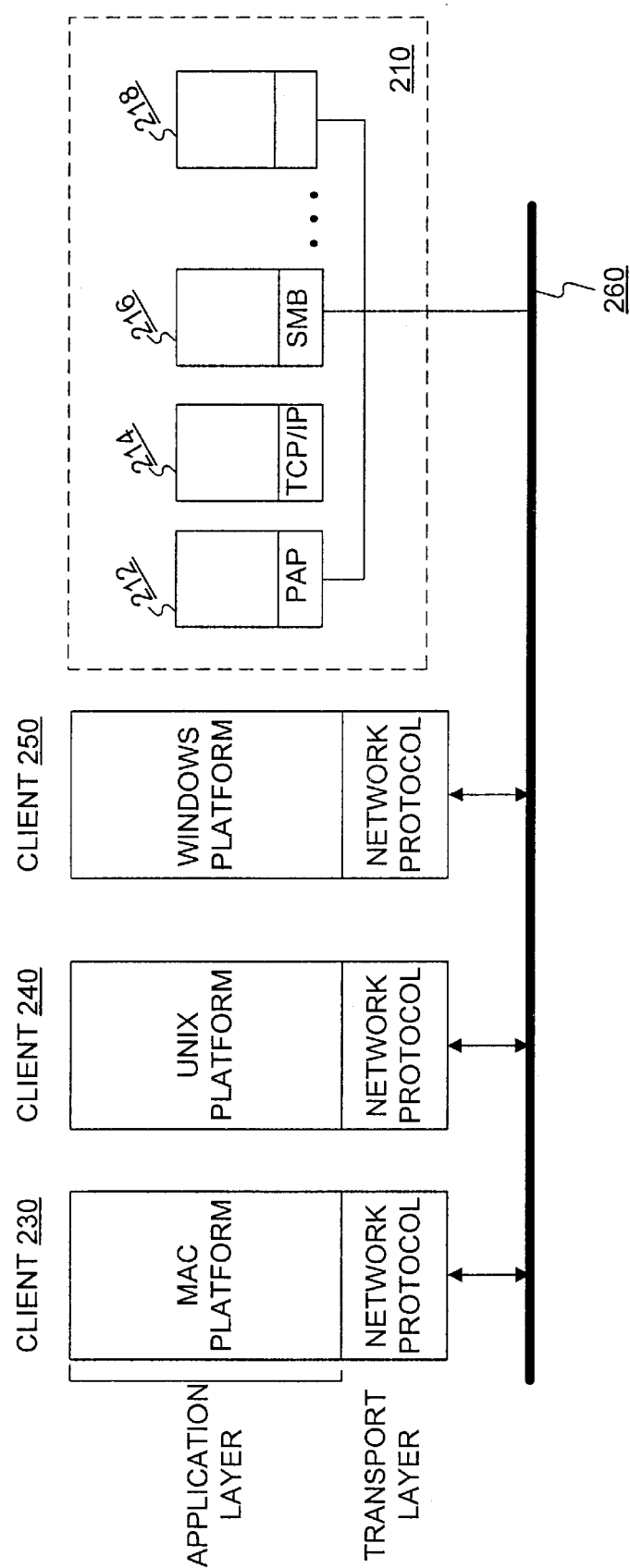
FIG. 2 illustrates a conventional print server.
Figure 3:
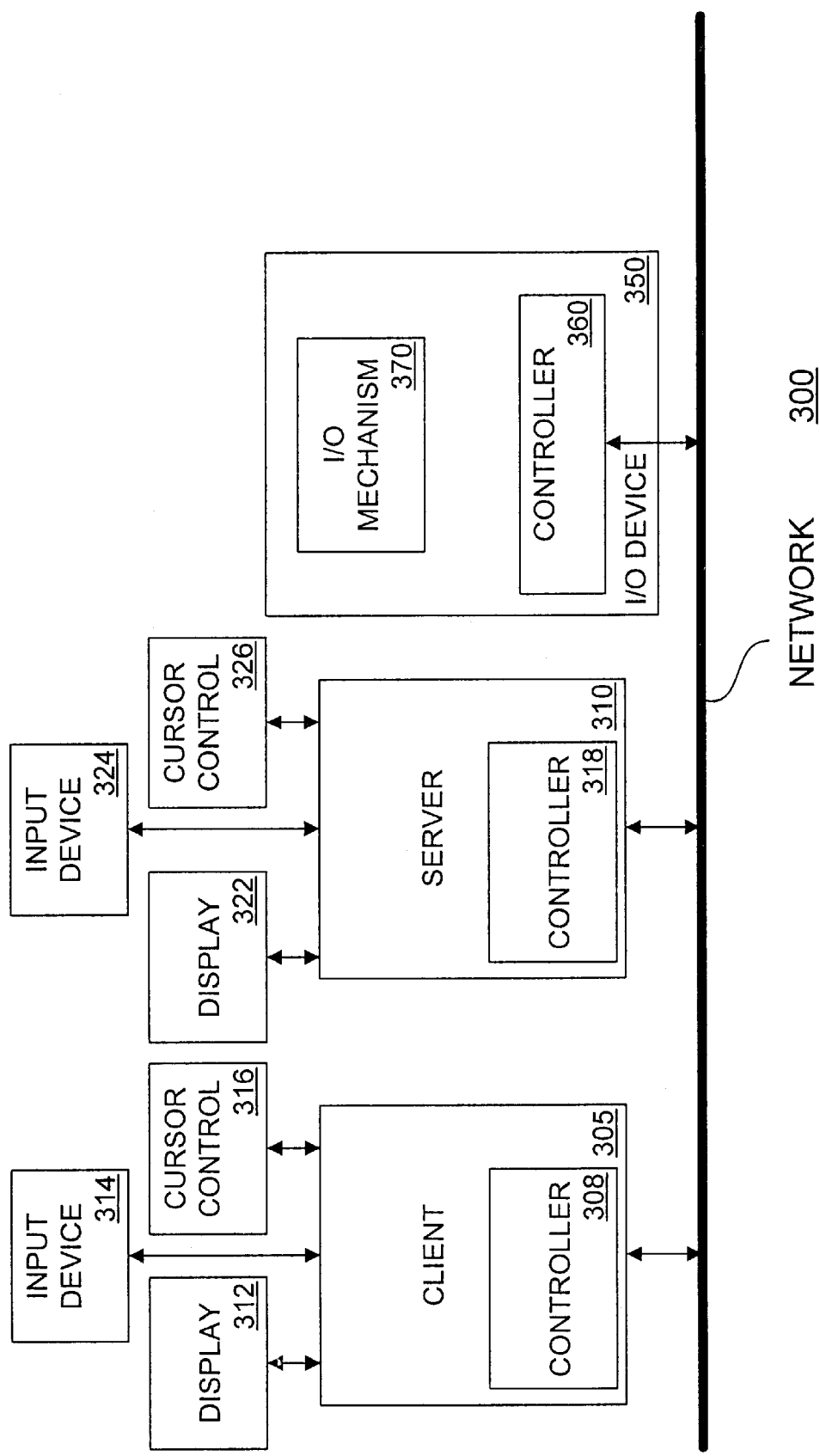
FIG. 3 shows a system consistent with the present invention.

FIG. 3 is a block diagram that illustrates an I/O system consistent with the present invention. As shown in FIG. 3, the I/O system comprises a client 305 acting as an initiator, a server 310, and an I/O device 350 capable of communicating with one another through network 300. Network 300 may be a LAN, WAN, or Internet comprising multiple LANs and WANs. Network 300 uses electric, electromagnetic, radio frequency, and/or optical signals to carry digital data streams. The signals that carry digital data through network 300 to and from client 305, server 310, and I/O device 350 are exemplary forms of carrier waves.

Client 305 and server 310 can send messages and receive data, including program code, through the network 300. For example, client 305 might transmit a request to download code for an application program to server 310, or server 310 may download the code to client 305 through network 300. One such downloaded application may be an input/output driver program, as described herein. In this manner, client 305 may obtain application code in the form of a carrier wave. For example, the application code may be encoded and transmitted as packets on a carrier wave.

Figure 4:
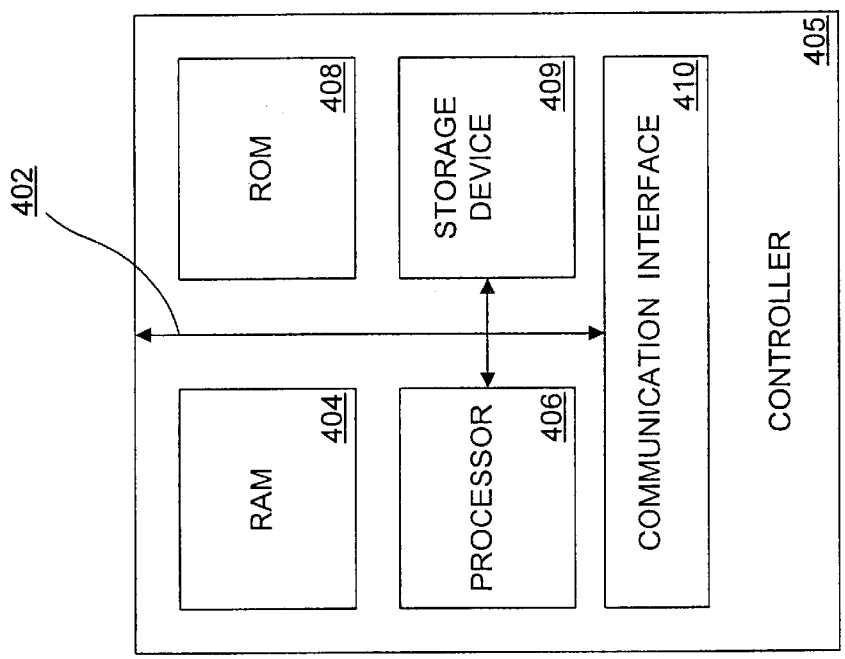
FIG. 4 shows a controller consistent with the present invention.

In FIG. 3, both client 305 and server 310 contain controllers 308 and 318, respectively, similar to controller 405 as shown in FIG. 4. Controller 405 contains a processor 406, RAM 404, ROM 408, storage device 409, and communication interface 410 capable of communicating via bus 402. Processor 406 is a conventional microprocessor unit. RAM 404 can be a static or dynamic storage device, and stores information, temporary variables, and instructions to be executed by processor 406. ROM 408, which can be any type of nonvolatile static storage device appropriate to the task, stores static information and instructions for processor 406. A storage device 410, such as a magnetic disk or optical disk, is provided and coupled to bus 402 for storing information and instructions.

Controller 405 also includes a communication interface 410 coupled to bus 402. Communication interface 410 provides a two-way data communication coupling to a network. For example, communication interface 410 may be an ISDN card, cable modem, or a modem to provide a data communication connection to a corresponding type of telephone line. As another example, communication interface 410 may be a LAN card that provides a data communication connection to a compatible LAN. Wireless links may also be implemented. In any such implementation, communication interface 410 sends and receives electrical, electromagnetic or optical signals that carry digital data streams representing various types of information.

Consistent with one implementation of the invention, processor 406 executes one or more sequences of instructions in ROM 408. Executing the sequences of instructions in memory ROM 408 causes processor 406 to perform the method for controlling access to a I/O device described below. Alternatively, hard-wired circuitry may be used in place of or in combination with software instructions. Systems and methods consistent with the present invention are not limited to any specific combination of hardware circuitry and software.

The term "computer-readable medium" as used herein refers to any media that participates in providing instructions to processor 406 for execution. Such a medium may take many forms, including but not limited to, non-volatile media, volatile media, and transmission media. Non-volatile media includes, for example, optical or magnetic disks, such as ROM 408. Volatile media includes dynamic memory, such as RAM 404. Transmission media includes coaxial cables, copper wire, and fiber optics, including bus 402. Transmission media can also take the form of acoustic or light waves, such as those generated during radio-wave and infra-red data communications. Common forms of computer-readable media include a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described above, or any other medium from which a computer can read data.

Various forms of computer readable media may be involved in carrying the instructions to processor 406 for execution. For example, the instructions may initially be carried on magnetic disk of a remote computer. The remote computer can load the instructions into its dynamic memory and send the instructions over a telephone line using a modem. A modem local to controller 405 can receive the data on the telephone line and use an infrared transmitter to convert the data to an infrared signal. An infrared detector coupled to bus 402 can receive the data carried in that signal and place the data on bus 402. Bus 402 carries the data to ROM 408, from which processor 406 retrieves and executes the instructions. The instructions received by processor 406 may also be stored on storage device 409 either before or after execution by processor 406.

Referring again to FIG. 3, client 305 and server 310 may be conventional PCs containing controllers 308 and 318, respectively. In addition, client 305 and server 310 may contain attached peripherals, such as displays, input devices, and devices for cursor control. In FIG. 3, client 305 is shown coupled via standard bus to display 312, input device 314, and cursor control 316. Server 310 is shown coupled via standard bus to display 322, input device 324, and cursor control 326. Displays 312 and 322 may be any conventional display device used for displaying information to a computer user, such as a CRT, LCD, LED, or custom display device. In addition, input devices 314 and 324 are devices, such as keyboards, that include alphanumeric and other keys for communicating information and command selections to client 305 and server 310. Another type of user input device is cursor control 316 and 326, such as a mouse, a trackball or cursor direction keys for communicating direction information and command selections to client 305 and server 310 and for controlling cursor movement on displays 312 and 322.

I/O device 350 may be an output device, such as a printer, or an input device, such as a scanner or digital camera. As shown in FIG. 3, I/O device 350 can include a controller 360 and an I/O mechanism 370. Controller 360 may be similar to controller 405 in FIG. 4, or may contain a smaller RAM, ROM, or storage device, or a processor with different capabilities. I/O mechanism 370 inputs or outputs data. If I/O device 350 is a laser printer, for example, I/O mechanism 370 may be a printer engine unit that converts data to printed pages. Pages can contain various types of content (such as text or graphics) and can be marked with a variety of compounds (such as ink, toner, heat, light, finisher, or pressure). Examples of output devices include printers, such as the Epson Stylus Color 5000. If I/O device 350 is an input device such a scanner, for example, I/O mechanism 370 may be a scan converter that converts printed information to digital data such as, for example, an Epson Scanner model ES-8000C.

Another example of an I/O system consistent with the present invention comprises a client 305 and I/O device 350. In this example, I/O device 350 comprises an embedded controller 360 that is similar to controller 405 illustrated in FIG. 4. Controller 360 then would perform both its own functions and those performed by controller 318 of server 310 in the embodiment described above. In this example, I/O device 350 may be an output device, such as a printer, or an input device, such as a scanner or digital camera with an enhanced controller. I/O device 350 may also be a conventional I/O device with an additional peripheral device, such as a PC Card. I/O device 350 can also contain only an I/O mechanism 370. In this embodiment, I/O device 350 will be physically connected to a device with a controller, such as client 305 or server 310.

Figure 5:
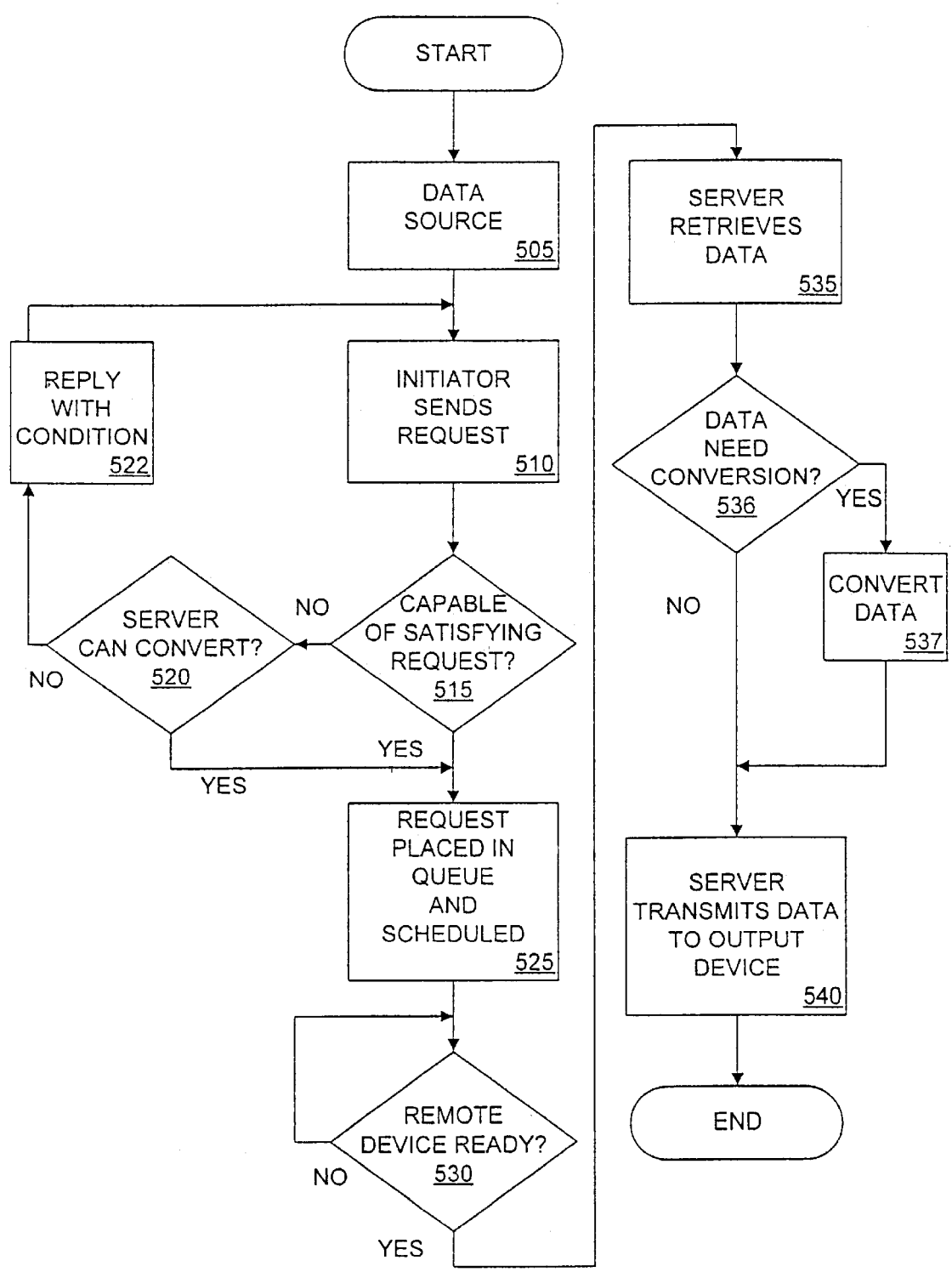
FIG. 5 is a flow diagram of operations performed to output to an output device consistent with the present invention.
Figure 6:
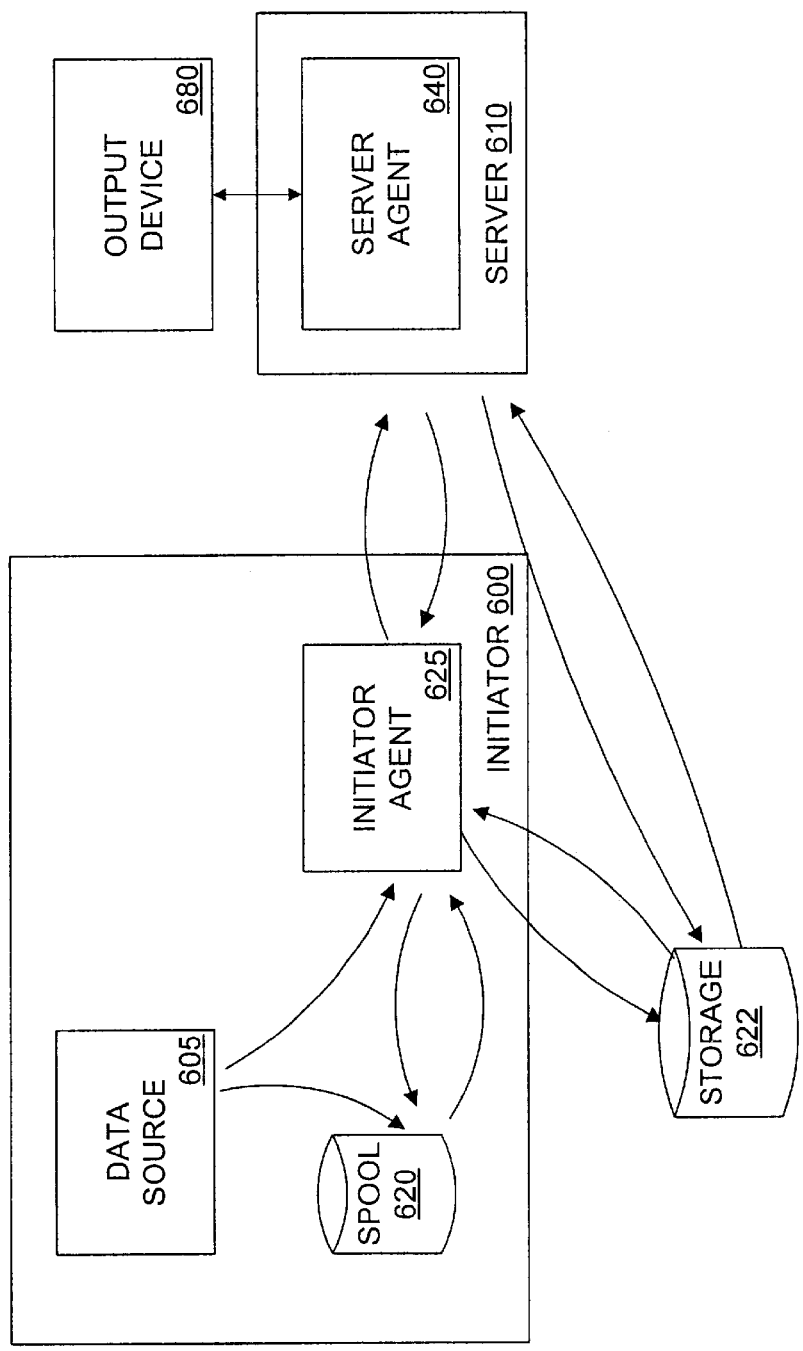
FIG. 6 is a data flow diagram consistent with the present invention.
Figure 7:
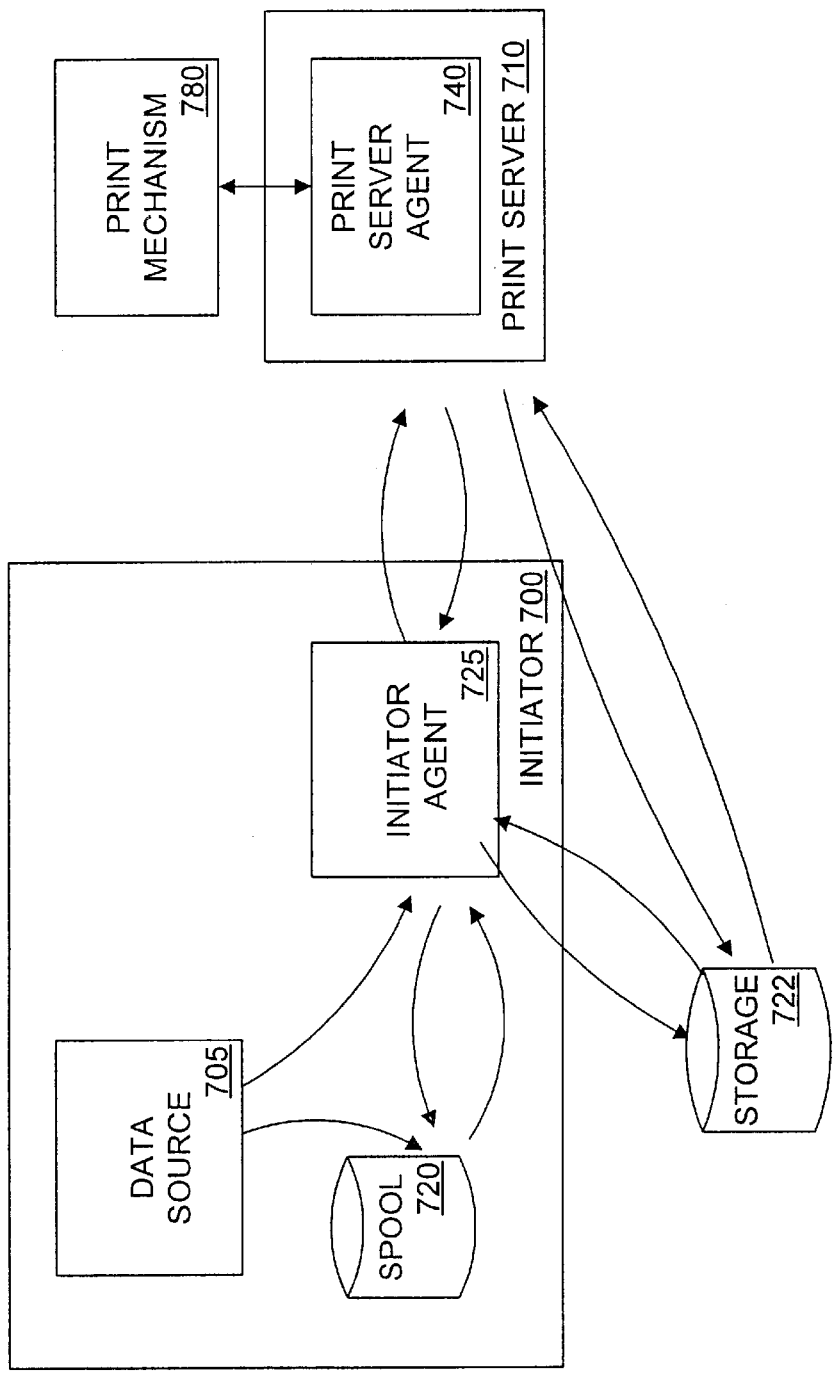
FIG. 7 is a data flow diagram of network printing consistent with the present invention.

The I/O systems described above may be used to implement methods of controlling access to I/O devices consistent with the present invention. FIG. 5 illustrates steps of a method of outputting data consistent with the present invention. FIG. 6 shows a data flow diagram illustrating the flow of data consistent with the method of FIG. 5. The steps of the method of FIG. are described in more detail below with reference to the system depicted in FIG. 3 and the data flow diagram of FIG. 6. FIG. 7 illustrates one embodiment of the method of FIG. 5 in which the I/O device is a printer.

Figure 8:
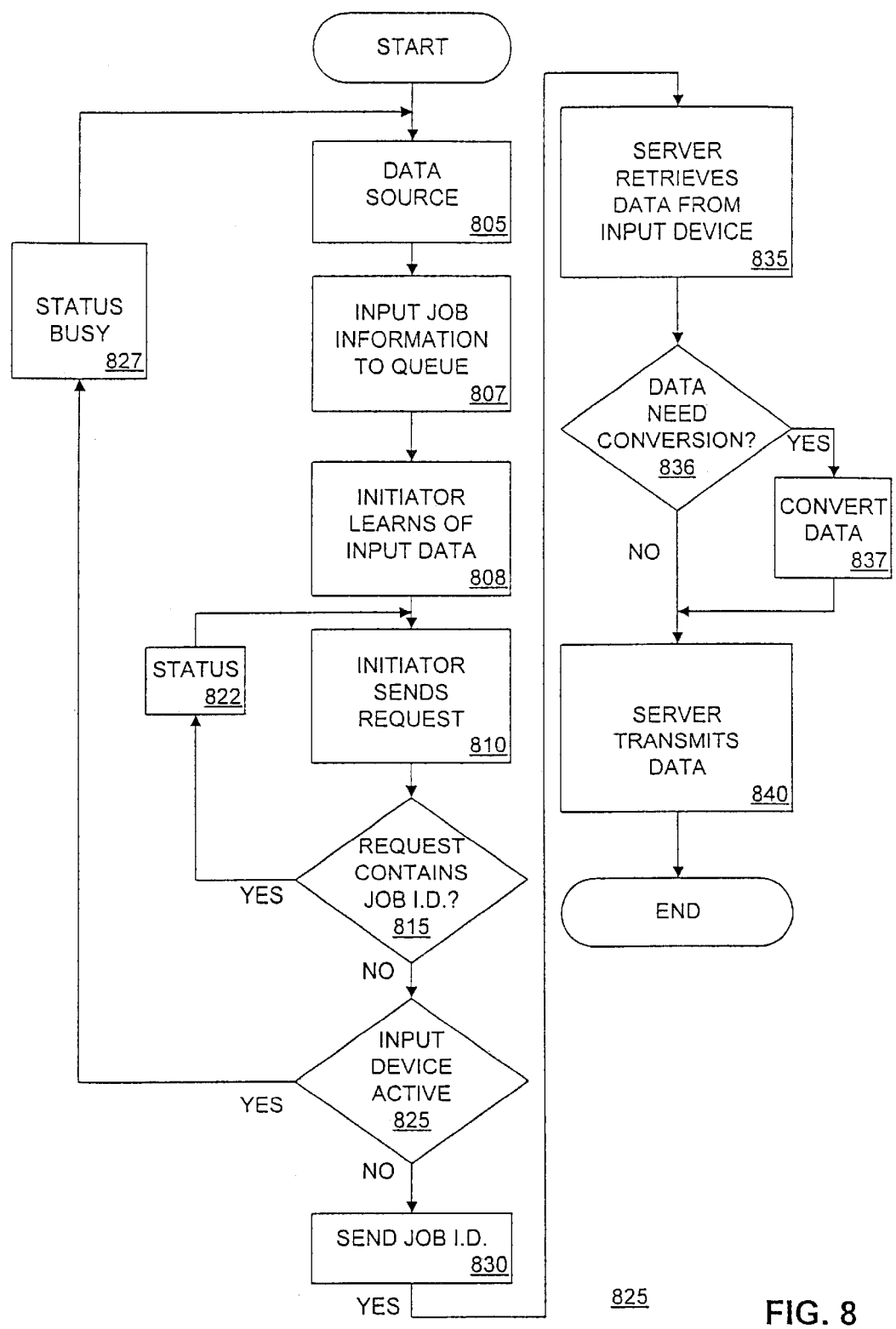
FIG. 8 is a flow diagram of operations performed to retrieve data from an input device consistent with the present invention.
Figure 9:
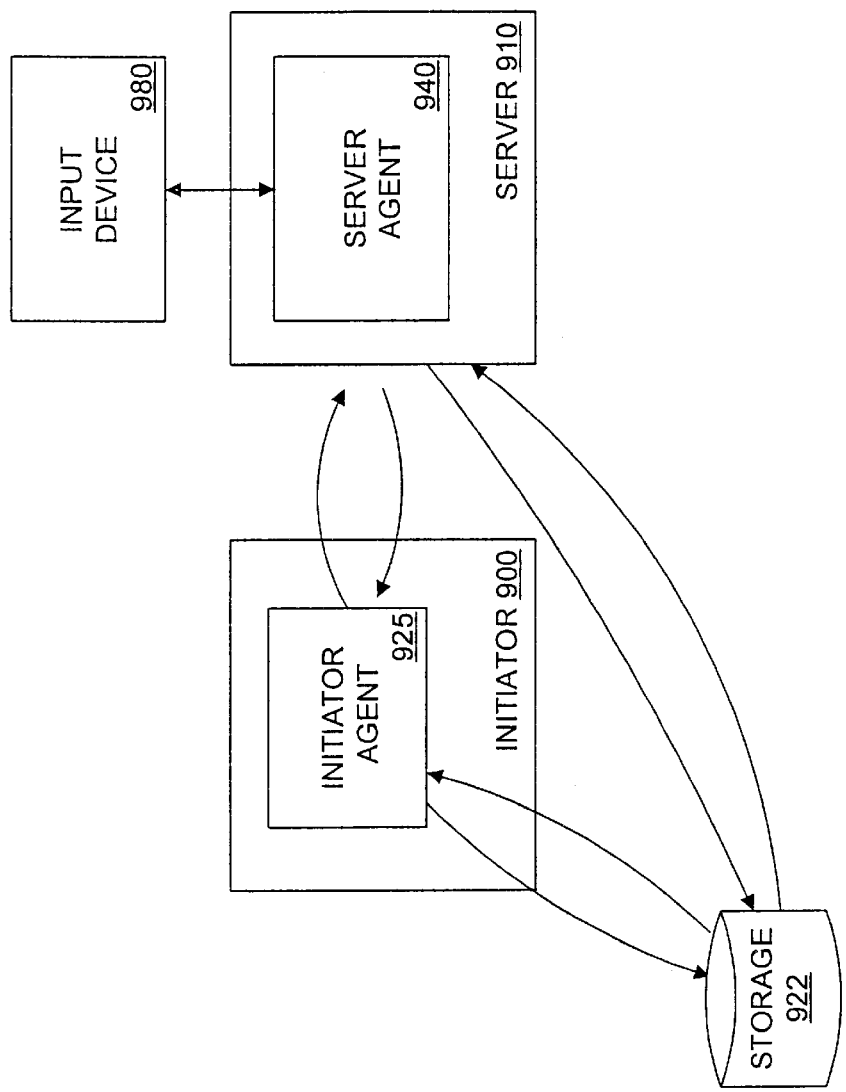
FIG. 9 is a data flow diagram consistent with the present invention.

FIG. 8 illustrates steps of a method of receiving data from an input device consistent with the present invention. FIG. 9 shows a data flow diagram illustrating the flow of data consistent with the method of FIG. 8. The steps of the method of FIG. 8 are described in more detail below with reference to the system depicted in FIG. 3 and the data flow diagram of FIG. 9. The method of FIG. 8 can be implemented for receiving data from an input device, such as a scanner, fax, or digital camera.

B. Outputting to an Output Device

With reference to FIGS. 5 and 6, the method begins with an initiator remote from the server providing data to be output (step 505). As shown in FIG. 6, data may be generated by data source 605 of initiator 600, which is remote from server 610, or initiator 600 may provide the data by, for example, reading previously generated data from a disk or other computer-readable medium. Initiator 600 may be, for example, client 305 of FIG. 3. Referring again to FIG. 6, the data is conditioned into the proper format by, for example, adding formatting commands or other information. The conditioned data may then be stored locally in, for example, spool 620 of initiator 600 or in another physical location, such as storage 622, which may be a file server operatively connected to a network and capable of communicating with initiator 600. Concurrently, data source 605 notifies initiator agent 625 that the data is ready for use and gives initiator agent 625 the location where the data is stored. Initiator agent 625 may be, for example, an HTTP client.

Initiator 600 then submits a request to server 610, which may be, for example, server 310 of FIG. 3 (step 510). If the output device has an embedded server, initiator 600 may submit the request directly to I/O device 350. Initiator agent 625 of initiator 600 formulates the request as an HTTP "POST" command. The POST command contains a URL of the location of the data to be outputted. The body of the request contains the page/request. The page/request may be encoded using MIME, in which case the lines following the command might include ContentType and authentication headers, to prove the initiator has permission to perform the requested operation. The POST request may also include information about the requirements such as the destination output device, output format type, and other special requirements. Alternatively, a user may invoke a browser or custom HTTP client to submit the same information as the POST command to the server.

Referring again to FIG. 5, the server receives the request and determines whether it is capable of satisfying the request (step 515). Server 310 of FIG. 3 may determine whether it is capable of outputting to the device requested and whether it has available storage space in the queue. There are many circumstances in which a server, like server 310, may not be capable of handling the request. The server, for example, may not be connected via the network to the device requested. The server may also recognize that the request specifies a particular output format, such as PostScript, and that none of the devices with which it has connectivity is capable of outputting in the requested output type.

If the server can handle the request, it responds and acknowledges the request, such as by transmitting a status line telling the initiator that it has received the request, placing the request in a queue, or by scheduling the request (step 525). If the server cannot handle the request in its current form, the server determines whether it can convert the request into a request that it can satisfy (step 520). For example, if the initiator requested that the data be output in a format that is not supported, the server may recognize that it can convert the data into the requested format or can obtain via the network the necessary tools for converting the request (such as conversion software). If the server can convert the data into a proper form, the server acknowledges the request (step 525).

If the server determines that it cannot handle the request, the server sends back an acknowledgment that it received the request but cannot accommodate it at this time (step 522). At this point, the process may be terminated or the process may be configured so that the client continues to post requests until the job is accepted by the server. If so, the process would continue from step 510.

If the request is scheduled, the initiator posts the job to a memory structure or "queue" (step 525). The job posting consists of the URL of the data output file which is stored in a location other than the queue. The server periodically monitors the output queue. Server agent 640 accesses the queue and adds, controls, and removes jobs from the queue. If the queue has jobs for output devices, and the output device is ready (step 530), the server retrieves the data from the storage location designated by the URL (step 535).

The server fetches the data using the URL (step 535), for example, by executing an HTTP GET object request. As shown in FIG. 6, server agent 640 of server 610 may transmit the request to initiator agent 625 of initiator 600, which may access data stored in spool 620. In another example, server agent 640 of server 610 transmits a GET request directly to storage 622, which may be, for example, a file server remote to initiator 600 and server 610. The amount of data that the server gets at any one time may depend on the capabilities of the output device for which the data is destined. If, for example, the output device is a serial device, a GET request may obtain only a small block of data. If the output device is a page-oriented device, such as a laser printer, the GET request may bring back data one page at a time. There are instances where the GET request may copy and bring back the entire output file. If the output device needs to output multiple copies of a large file, for example, the output process may be quicker if the destination client retrieves a copy of the entire output file rather than make multiple requests one page at a time.

If the data needs conversion (step 536), the server may convert the data (step 537) before sending it to output device

680 (step 540). If the data does not need conversion, the server simply transmits it to output device 680 (step 540). The transfer may be by parallel interface or other suitable interface such as USB, RS 232, or 1394 interfaces, or by a network or internet. Transfer may also be via internal proprietary CPU bus or a standard bus.

Methods consistent with the present invention allow data storage to be distributed over the network thereby reducing the need for any one device, such as a server, to possess large amounts of disk space. By storing data across more locations on the network and retrieving data to be outputted or inputted when needed from its storage location, network operation is more efficient. The initiator will know whether the output device is capable of handling the output request prior to commencing the job.

C. Network Printing

The outputting method of the present invention may also be described with reference to network printing. As shown in FIG. 5, the method begins with an initiator remote from the print server providing data to be printed (step 505). In FIG. 7, like FIG. 6, data source 705 of initiator 700 provides the data to be printed by, for example, generating the data or reading previously generated data from a disk or other computer-readable medium. Referring again to FIG. 7, the data is conditioned into the proper format by, for example, adding formatting commands or other information. The conditioned data is stored and data source 705 gives initiator agent 725 the location where the data is stored. Initiator agent 725 may be, for example, an HTTP client.

Initiator 700 then submits a request to print server 710, which may be, for example, server 310 of FIG. 3 (step 510). If the output device is a printer with embedded server or controller, similar to I/O device 350 of FIG. 3, initiator 700 may submit the request directly to the enhanced printer. Initiator agent 725 of initiator 700 formulates the request as an HTTP "POST" command containing a URL of the location of the data to be printed. The POST request may also include information about the printer, printer format types, and other special requirements. Alternatively, a user may invoke a browser or custom HTTP client to submit the same information as the POST command to print server 710.

Referring again to FIG. 5, the server receives the request and determines whether it is capable of satisfying the request (step 515). Print server 710 may determine whether it is capable of printing to the device requested and whether it has available storage space in the queue. If print server 710 can handle the request, printer server agent 740 responds and acknowledges the request, such as by transmitting a status line telling the initiator that it has received the request, placing the request in a queue, or by scheduling the request (step 525). If print server 710 cannot handle the request in its current form, print server 710 determines whether it can convert the request into a request that it can satisfy (step 520). For example, if the initiator requested that the data be printed in a format that is not supported, print server 710 may recognize that it can convert the data into the requested format or can obtain via the network the necessary tools for converting the request (such as conversion software). If print server 710 can convert the data into a proper form, print server 710 acknowledges the request (step 525).

If print server 710 determines that it cannot handle the request, print server 710 sends back an acknowledgment that it received the request but cannot accommodate it at this time (step 522). At this point, the process may be terminated or the process may be configured so that the client continues to post requests until the job is accepted by print server 710. If so, the process would continue from step 510.

If the request is scheduled, the initiator posts the job to a memory structure or "queue" (step 525). The job posting consists of the URL of the data output file which is stored in a location other than the queue. Print server 710 periodically monitors the output queue. Server agent 740 accesses the queue and adds, controls, and removes jobs from the queue. If the queue has jobs for a printer, and the printer is ready (step 530), the server retrieves the data from the storage location designated by the URL (step 535).

The server fetches the data using the URL (step 535), for example, by executing an HTTP GET object request. As shown in FIG. 7, server agent 740 of print server 710 may transmit the request to initiator agent 725 of initiator 700, which may access data stored in spool 720. In another example, server agent 740 of print server 710 transmits a GET request directly to storage 722, which may be, for example, a file server remote to initiator 700 and print server 710. The amount of data that the server gets with at any one time may depend on the capabilities of the printer for which the data is destined. If, for example, the printer is a serial device, a GET request may obtain only a small block of data. If the printer is a page-oriented device, such as a laser printer, the GET request may bring back data one page at a time. There are instances where the GET request may copy and bring back the entire output file. If the printer needs to output multiple copies of a large file, for example, the output process may be quicker if the destination client retrieves a copy of the entire output file rather than make multiple requests one page at a time.

If the data needs conversion (step 536), the server may convert the data (step 537) before sending it to print mechanism 780 (step 540). If the data does not need conversion, the server simply transmits it to print mechanism 780 (step 540). Print mechanism 780 may be, for example, a printer engine unit that converts data to printed pages. The transfer may be by parallel interface or other suitable interface such as USB, RS 232, or 1394 interfaces, or by a network or internet. Transfer may also be via internal proprietary CPU bus or a standard bus.

Methods consistent with the present invention allow data storage to be distributed over the network thereby reducing the need for any one device, such as a server, to possess large amounts of disk space. By storing data across more locations on the network and retrieving data to be outputted or inputted when needed from its storage location, network operation is more efficient. The initiator will know whether the printer is capable of handling the output request prior to commencing the job and less paper will be wasted by printing improperly formatted print jobs.

D. Inputting from an Input Device

The I/O systems described above may also be used to control an input device that receives or generates data. FIG. 8 also illustrates an example of a method of receiving data from an input device, such as a scanner, digital video camera, or fax. The steps of the method are illustrated with reference to the systems depicted in FIG. 3 and the data flow diagram of FIG. 9.

Consistent with the present invention, the method begins with the generation of data at the input device (step 805), such as by putting a document on a scanner, turning on a video camera, or receiving a signal indicating an incoming fax. Receipt of input data therefore generally begins with the input device 980 of FIG. 9. Input device 980 will convert the received images to digital data and may also store the data to a location in input device 980, server 910, or another accessible storage location. Input device 980 may also accept a list of addresses to which the device would like to transfer the input data. For example, input device 980 may be a digital fax machine that accepts a document, converts it to digital data, and allows the user to input various network addresses that would like to receive the faxed information.

Input device 980 notifies the server that input device 980 has data to transmit by, for example, transmitting input job information to the server. The input job information may contain such information as format type or destination, such as a list of storage addresses or a list of recipients. Server 910 stores the input job information to an input queue (step 807). Initiator 910 may learn that information is available at input device 980 by, for example, receiving notice from server 910 or periodically checking the input queue (step 808).

To get the data from input device 980, initiator 900 sends a request to server 910 based on the input job information (step 810). Initiator agent 925 of initiator 900 formulates the request as an HTTP "GET" command containing a URL of the location of the data to be retrieved. The body of the request contains the page/request. The page/request may be encoded using MIME, in which case the lines following the command might include ContentType and authentication headers to prove the initiator has permission to perform the requested operation. The GET request may also include information about the requirements such as the input device, input format type, and other special requirements. Alternatively, a user may invoke a browser or custom HTTP client to submit the same information as the GET command to the server.

Server 910 receives the request. If the GET request contains a job identifier (step 815), server agent 940 either returns the status of the job to initiator 900 (step 822) or executes the GET request.

If the request does not specify a job identifier (step 815), server 910 recognizes the request as a new request. Server 910 then queries input device 980 for data by invoking server agent 940, which may be, for example, a process or CGI script. If input device 980 is active (step 825), input device 980 is currently satisfying a different job and is unavailable. Server agent 940 returns a "busy" status to initiator 900 (step 827).

If input device 980 is inactive (step 825), server agent 740 responds to initiator 900 with a job identifier (step 830). Server agent 940 then retrieves data from input device 980, for example, by executing an HTTP GET object request (step 835). The amount of data that server 910 receives with any one request may depend on the capabilities of the input device for which the job is destined. If, for example, the input device is a serial device, a GET request may obtain only a small block of data. If the input device is a page-oriented device, such as a laser printer, the GET request may bring back data one page at a time. Additionally, there are instances where the GET request may copy and bring back the entire input file. If the input device needs to input multiple copies of a large file, for example, the input process may be quicker if the destination client retrieves a copy of the entire input file rather than make multiple requests one page at a time.

Server 910 receives the data and determines whether the data needs conversion to the format requested by initiator 900 (step 836). If the data needs to be converted, server 910 converts the data (837). Server 910 transmits the data to a destination based either on the input job information or the request from the initiator (step 840). The transfer may be by parallel interface or other suitable interface such as USB, RS 232, or 1394 interfaces.

E. Querying for Status

Figure 10:
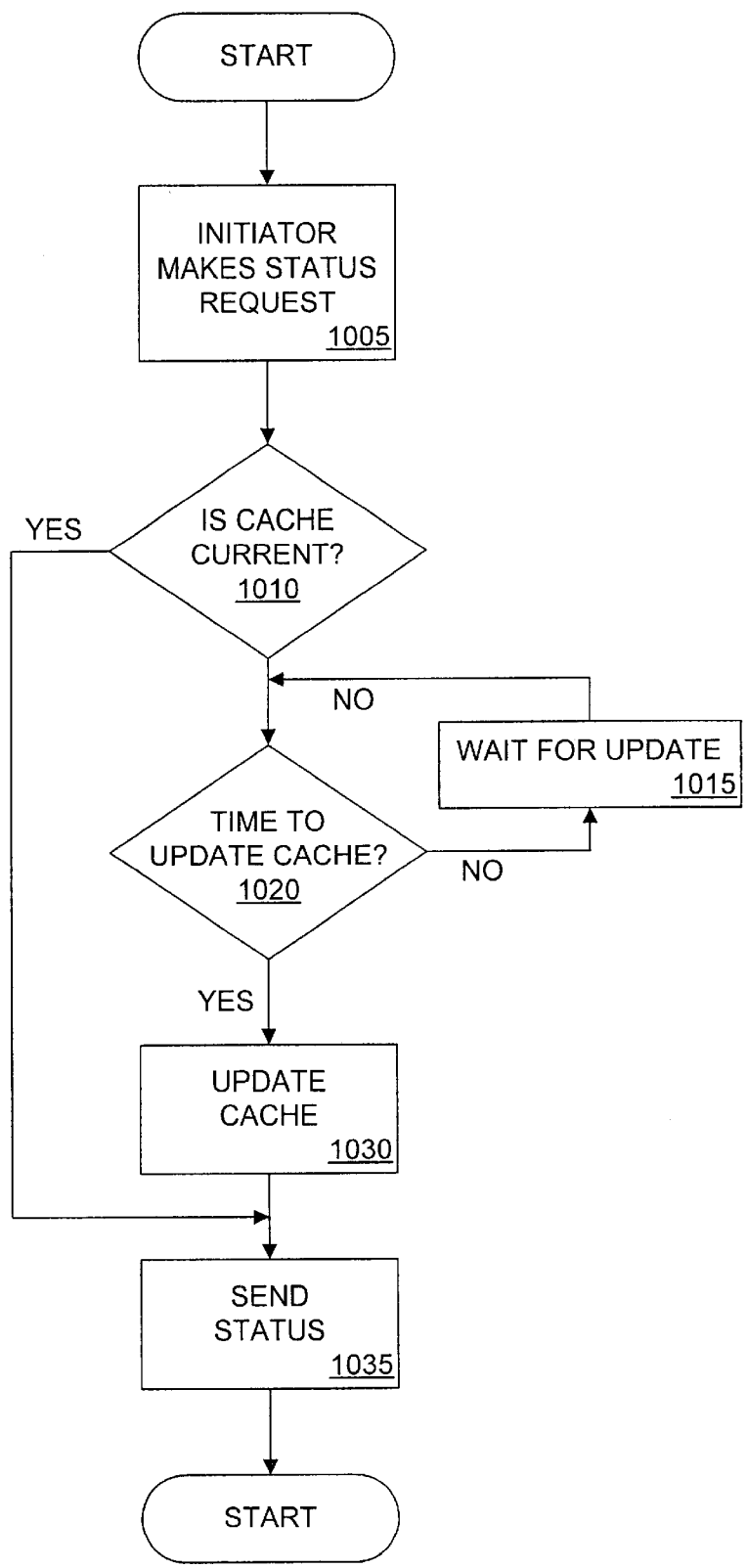
FIG. 10 is a flow diagram of operations performed to obtain status information consistent with the present invention.

Using an HTTP protocol for communications between an initiator and a server, an initiator may also query the server (or an I/O device with embedded server) for status of the I/O request or the I/O device. FIG. 10 illustrates the steps of requesting and receiving status reports.

To obtain status, initiator 600 or 900 makes a status request (step 1005) including, for example, job identifier, information containing in the I/O request, or information identifying the I/O device (output device 680 or input device 980). In an HTTP environment, the status request may be made in the form of a GET request to a server, such as server 610 in FIG. 7 or server 910 in FIG. 9. The GET request may also be followed by header information that asks the server to send only that data that has been modified since the last status request.

Consistent with the present invention, status information is stored in a status information cache on the I/O server. Frequently contacting an I/O device for status may interrupt or slow data transfer, particularly if status is checked very frequently. Use of a status cache can control interruptions to I/O devices and improve performance. The cache is updated during idle states or when there is an error at the I/O device that prevents data transfer. Another advantage of caching status information on the server is that the server administrator can define the rules for updating the status cache and the frequency of status queries to the I/O device.

Before providing the initiator with status, the I/O server may check to see if the status cache contains current status information (step 1010). The server may, for example, compare the time on the request to see if the cache has been updated since the last status request. If the cache is current, the server may send the status information from the cache (step 1025).

If the status information is not current, the server determines whether it is an appropriate time to update the status cache. If not, the server may wait for an update (step 1015) or send the information that is in the cache. If, however, the server has not queried the I/O device in a long time, or if the server detects that the I/O device is inactive, the server may update the cache by querying the I/O device for status (step 1020).

The I/O server then formats a reply containing the status of the I/O device and transmits the information to the initiator (step 1025).

F. Conclusion

As described in detail above, methods and apparatus consistent with the present invention operate in a network environment having an initiator, a server, and an I/O device. The initiator requests a server to perform an input/output transactions and negotiates the specifics of the transaction with the server. When the request is ready to be initiated, the server "pulls" the data from one location and sends it to another. The foregoing description of an implementation of the invention has been presented for purposes of illustration and description. Modifications and variations are possible in light of the above teachings or may be acquired from practicing the invention.

Although systems and methods consistent with the present invention are described as operating in the exemplary distributed system, one skilled in the art will appreciate that the present invention can be practiced in other systems and programming environments. The scope of the invention is therefore defined by the claims and their equivalents.

What is claimed is:

1. A method for outputting data in a network comprising an initiator, server, and an output device remote from the initiator, the method comprising the operations, performed by the server, of:

receiving a request from an initiator to output data provided by the initiator using the output device, the request comprising a network storage location of data to be output;

placing the request in a queue;

scheduling an output action based on the request in the queue; and determining if a requested output format specified in the request is supported by said output device; and retrieving the output data from the network storage location outside the server based on the request if the requested output format is supported by said output device and only when the scheduled action is ready to be executed on the output device without delay from any other request for outputting additional output data to said output device, wherein the network storage location of the output data is different from the queue.

2. The method of claim 1, further comprising:

transmitting the data to the output device to perform the scheduled action.

3. The method of claim 1, wherein:

if the requested output format is not supported by said output device then determining if conversion software for providing said output device with support for the requested output format is available internally to said server, and if conversion software is available internally then using said conversion software to convert said output data.

4. The method of claim 3, wherein if the requested output format is not supported by said output device and conversion software for providing said output device with support for the requested output format is not available within said server, then locating appropriate conversion software on said network and downloading said appropriate conversion software in said server for converting said output data.

5. The method of claim 1, further comprising:

transmitting an acknowledgment to the initiator if the server is capable of fulfilling the request.

6. The method of claim 1, further comprising:

transmitting an acknowledgment to the initiator if the server is capable of fulfilling the request.

7. The method of claim 1, further comprising:

receiving updated status information from said output device;

storing said received updated status information in a cache;

responding to a status request from said initiator by transmitting status information directly from said cache in response to the status request without communicating with said output device.

8. The method of claim 7, wherein said step of responding to a status request from said initiator further comprising:

determining if a time period since the most recently received updated status information from said output device is longer than a predefined minimum time period;

if said time period is less than said predefined minimum time period then responding to said status request from said initiator by transmitting status information directly from said cache in response to the status request without communicating with said output device; and if said time period is not less than said predefined minimum time period then requesting new update status data from said output device, storing said new update status data in said cache, and relaying said new update status data to said initiator.

9. A method for receiving data from an input device in a network comprising a client, a server, and said input device, the method comprising the operations, performed by the server, of:

receiving input job information transmitted from the input device when the input device inputs data;

storing the input job information to an input queue;

retrieving the data from the input device based on the input job information when the input device is available;

receiving a request from the client inquiring whether an input job is in queue for it as determined from said input job information, and if the determination is a affirmative then processing data from the input device based on the input job information.

10. The method of claim 9, further comprising:

transmitting the data to a location based on the input job information.

11. The method of claim 9, further comprising:

transmitting the data to a location specified by said client.

12. The method of claim 9, further comprising:

converting the data to a format based on the request.

13. The method of claim 9, further comprising:

determining whether the server is capable of fulfilling the request; and transmitting an acknowledgment to the client if the server is capable of fulfilling the request.

14. The method of claim 9, further comprising:

receiving updated status information from said input device;

storing said received updated status information in a cache;

responding to a status request from said client by transmitting status information directly from said cache in response to a status request without communicating with said input device.

15. The method of claim 14, wherein said step of responding to a status request from said client further comprising:

determining if a time period since the most recently received updated status information from said input device is longer than a predefined minimum time period;

if said time period is less than said predefined minimum time period then responding to said status request from said initiator by transmitting status information directly from said cache in response to the status request without communicating with said output device; and if said time period is less than said predefined minimum time period then then requesting new update status data from said output device, storing said new update status data in said cache, and relaying said new update status data to said client.

16. A computer-readable medium containing instructions for outputting data in a network comprising an initiator, a server, and an output device remote from the initiator, the instructions corresponding to tasks executable by a computer and performed by the server, for:

receiving a request from an initiator to output data provided by the initiator using the output device, the request comprising a network storage location of data to be output;

placing the request in a queue;

scheduling an output action based on the request in the queue;

determining if a requested output format specified in the request is supported by said output device; and retrieving the output data from the network storage location based on the request if the requested output format is supported by said output device and only when the scheduled action is ready to be executed on the output device without delay from any other request for outputting additional output data to said output device, wherein the network storage location of the output data is different from the queue.

17. The computer readable medium of claim 16, further comprising instructions for:

transmitting the data to an output device to perform the scheduled action.

18. The computer readable medium of claim 16, further comprising instructions for:

if the requested output format is not supported by the output device then determining if conversion software for providing said output device with support for the requested output format is available internally to said server, and if conversion software is available internally then using said conversion software to convert said output data.

19. The computer readable medium of claim 13, wherein scheduling comprises instructions for:

determining whether the server is capable of fulfilling the request; and scheduling an action based on the request if the server is capable of fulfilling the request.

20. The computer readable medium of claim 13, further comprising instructions for:

transmitting an acknowledgment to the initiator if the server is capable of fulfilling the request.

21. The computer readable medium of claim 16, further comprising instructions for:

receiving updated status information from said output device;

storing said received updated status information in a cache;

responding to a status request from said initiator by transmitting status information directly from said cache in response to the status request without communicating with said output device.

22. A computer-readable medium containing instructions for retrieving data from an input device in a network comprising an initiator, a server, and said input device remote from the client, the instructions corresponding to tasks executable by a computer and performed by the server, for:

receiving input job information transmitted from the input device when the input device inputs data;

storing the input job information to an input queue;

retrieving the data from the input device when the input device is available;

receiving a request from the client inquiring whether an input job is in queue for it as determined from said input job information, and if the determination is affirmative then processing data from the input device based on the input job information; and transmitting the data to a location based on a data destination information provided by said client.

23. The computer readable medium of claim 22, further comprising instructions for:

transmitting the data to a location based on the input job information.

24. The computer readable medium of claim 22, further comprising instructions for:

converting the data to a format based on the request.

25. The computer readable medium of claim 22, further comprising instructions for:

receiving updated status information from said input device;

storing said received updated status information in a cache;

responding to a status request from said client by transmitting status information directly from said cache in response to a status request without communicating with said input device.

26. The computer readable medium of claim 22, further comprising instructions for:

determining whether the server is capable of fulfilling the request; and transmitting an acknowledgment to the client if the server is capable of fulfilling the request.

27. An apparatus for controlling data in a network comprising an initiator, a server, and an output device remote from the initiator, the apparatus comprising:

a memory having program instructions; and a processor configured to receive a request from said initiator to output data provided by the initiator using the output device, the request comprising a network storage location of data to be output;

place the request in a queue;

schedule an output action based on the request in the queue;

determining if a requested output format specified in the request is supported by said output device; and retrieve the output data from the network storage location outside the server based on the request if the requested output format is supported by said output device and only when the scheduled action is ready to be executed on the output device without delay from any other request for outputting additional output data to said output device, wherein the network storage location of the output data is different from the queue.

28. The apparatus of claim 27, wherein the processor is also configured to:

transmit the data to the output device to perform the scheduled action.

29. The apparatus of claim 27, wherein the processor is also configured to:

if the requested output format is not supported by said output device, then determining if conversion software for providing said output device with support for the requested output format is available internally to said server, and if conversion software is available internally then using said conversion software to convert said output data.

30. The apparatus of claim 27, wherein the processor is configured to implement scheduling by:

determining whether the server is capable of fulfilling the request; and scheduling an action based on the request if the server is capable of fulfilling the request.

31. The apparatus of claim 27, wherein the processor is also configured to:

transmit an acknowledgment to the initiator if the server is capable of fulfilling the request.

32. The apparatus of claim 27, wherein the processor is also configured to:
- receive updated status information from said output device;
- store said received updated status information in a cache;
- respond to a status request from said initiator by transmitting status information directly from said cache in response to the status request without communicating with said output device.

33. An apparatus for controlling data in a network comprising a client, a server, and an input device remote from the client, the apparatus comprising:
- a memory having program instructions; and
- a processor configured to:
  - receive input job information transmitted from the input device when the input device inputs data;
  - store the input job information to an input queue;
  - retrieve the data from the input device when the input device is available;
  - receive a request from the client inquiring whether an input job is in queue for it as determined from said input job information, and if the determination is affirmative then processing data from the input device based on the input job information.

34. The apparatus of claim 33, wherein the processor is further configured to:
- transmit the data to a location based on the input job information.

35. The apparatus of claim 33, wherein the processor is further configured to:
- transmit the data to a location based on the request.

36. The apparatus of claim 33, wherein the processor is further configured to:
- convert the data to a format based on the request.

37. The apparatus of claim 33, wherein the processor is further configured to:
- determine whether the server is capable of fulfilling the request; and
- transmit an acknowledgment to the client if the server is capable of fulfilling the request.

38. The apparatus of claim 33, wherein the processor is also configured to:
- receive updated status information from said input device;
- store said received updated status information in a cache;
- respond to a status request from said client by transmitting status information directly from said cache in response to a status request without communicating with said input device.

39. A data control system comprising:
- an initiator for transmitting a request to output data provided by the initiator, the request comprising a network storage location of the output data;
- an output device remote from the initiator for outputting the data based on the request; and
- a server for receiving the request, placing the request in a queue, scheduling an output action based on the request, and retrieving the output data from the network storage location outside the server based on the request when the scheduled action is ready to be executed on the output device, wherein the network storage location is different from the queue; and
- an output device remote from the initiator for outputting the data based on the request; wherein
said server determines if a requested output format specified in the request is supported by said output device, if the requested output format is not supported then said server determines if conversion software for providing said output device with support for the requested output format is available internally to said server, and if conversion software is a available internally then using said conversion software to convert said output data.

40. A data control system comprising:
- a server;
- an input device for generating data and transmitting input job information to said server; and
- wherein said server is effective for:
  - storing the input job information from the input device to an input queue;
  - retrieving data from the input device based on the input job information when the input device is available;
  - receiving a request from the client inquiring whether an input job is in queue for it as determined from said input job information, and if the determination is affirmative then processing data from the input device based on the input job information.

41. A server in a data control system having an initiator, a server, and an output device remote from the initiator, the server comprising:
- means for receiving a request from said initiator to output data provided by the initiator using the receiving a request from an initiator to output data provided by the output data;
- means for placing the request in a queue;
- means for scheduling an action based on the request; and
- means for determining if a requested output format specified in the request is supported by said output device; and
- means for retrieving the data from the network storage location outside the server based on the request if the requested output format is supported by said output device and only when the scheduled action is ready to be executed on the output device without delay from any other request for outputting additional output data to said output device, wherein the network storage location of the output data is different from the queue.

42. The server of claim 41, further comprising:
- means for transmitting the data to an output device to perform the scheduled action.

43. The server of claim 41, further comprising:
- means for determining if conversion software for providing said output device with support for the requested output format is available internally to said server if the requested output format is not supported by the server, and if conversion software is available internally then using said conversion software to convert said output data.

44. The server of claim 41, wherein the means for scheduling comprises:
- means for determining whether the server is capable of fulfilling the request; and
- means for scheduling an action based on the request if the server is capable of fulfilling the request.

45. The server of claim 41, further comprising:
- means for transmitting an acknowledgment to the initiator if the server is capable of fulfilling the request.

46. The server of claim 41, further comprising:
- means for transmitting status information in response to a status request.

47. A data control system having a client, a server, and an input device, the server comprising:

means for receiving input job information transmitted from the input device when the input device inputs data;

means for storing the input job information to an input queue;

means for retrieving the data from the input device based on the request when the input device is available; and means for receiving a request from the client inquiring whether an input job is in queue for it as determined from said input job information, and if the determination is affirmative then processing data from the input device based on the input job information.

48. The system of claim 47, further comprising:

means for transmitting the data to a location based on the input job information.

49. The system of claim 47, further comprising:

means for transmitting the data to a location based on the request.

50. The system of claim 47, further comprising:

means for converting the data to a format based on the request.

51. The system of claim 47, further comprising:

means for determining whether the server is capable of fulfilling the request; and means for transmitting an acknowledgment to the client if the server is capable of fulfilling the request.

52. The system of claim 47, further comprising:

means for receiving updated status information from said input device;

means for storing said received updated status information in a cache;

means for responding to a status request from said client by transmitting status information directly from said cache in response to a status request without communicating with said input device.

53. A network output device comprising:

an output mechanism;

a memory having program instructions; and a processor configured to receive a request comprising a network storage location of data provided by an initiator remote from the network output device, place the request in a queue;

schedule an action based on the request;

retrieve the data from the network storage location based on the request when the scheduled action is ready to be executed on the output device, wherein the network storage location of the data is different from the queue; and determine if a requested output format specified in the request is supported by said output mechanism, if the requested output format is not supported then determining if conversion software for providing said output mechanism with support for the requested output format is available, and if conversion software is available then using said conversion software to convert said data.

54. A network printer in a network comprising an initiator and a network printer, the network printer comprising:

a print mechanism for outputting data provided by the initiator; and a controller for receiving a request from said initiator to output data provided by the initiator, the request comprising a network storage location of the data to be output;

placing the request in a queue;

scheduling an output action based on the request in the queue;

retrieving the output data from the network storage location outside based on the request when the scheduled action is ready to be executed on the print mechanism, wherein the network storage location of the output data is different from the queue;

determining if a requested output format specified in the request is supported by said print mechanism, if the requested output format is not supported then determining if conversion software for providing said print mechanism with support for the requested output format is available to said controller, and if conversion software is available then using said conversion software to convert said output data, and transmitting the converted data to the print mechanism.

55. A method for outputting data in a network comprising an initiator; server, and an output device remote from the initiator, the method comprising the operations, performed by the server, of:

receiving a request from an initiator to output data provided by the initiator using the output device, the request comprising a network storage location of data to be output;

placing the request in a queue;

scheduling an output action based on the request in the queue;

retrieving the output data from the network storage location based on the request when the scheduled action is ready to be executed on the output device, wherein the network storage location of the output data is different from the queue;

receiving updated status information from said output device;

storing said received updated status information in a cache; and responding to a status request from said initiator by transmitting status information directly from said cache in response to the status request without communicating with said output device.

* * * * *

UNITED STATES PATENT AND TRADEMARK OFFICE
CERTIFICATE OF CORRECTION

PATENT NO.    : 6,636,891 B1
DATED         : October 21, 2003
INVENTOR(S)   : Gregory Leclair et al.

It is certified that error appears in the above-identified patent and that said Letters Patent is hereby corrected as shown below:

<u>Title page,</u>
Item [56], References Cited, OTHER PUBLICATIONS, change "/ps2a.htm" to -- lps2a.htm --.

<u>Column 13,</u>
Line 35, change "in" to -- into --.
Lines 39 to 41, change "The method of claim 1, further comprising: trasmitting an acknowledgement to the initiator if the server is capable of fulfilling the request." to -- The method of claim 1, wherein scheduling comprises: determining whether the server is capable of fulfilling the request; and scheduling an action based on the request if the server is capable of fulfilling the request. --

<u>Column 14,</u>
Line 51, delete the second occurrence of the word "then".

<u>Column 15,</u>
Lines 24 and 30, change "claim 13" to -- claim 16 --.
Line 47, change "initiator, a" to -- client, a -- .

<u>Column 18,</u>
Lines 26 through 28, change "receiving a request from an initiator to output data provided by the output data" to -- output device, the request comprising a network storage location of the output data --; and
Line 30, delete "and".
Lines 64 and 65, change "means for transmitting status information in response to a status request" to -- means for receiving updated status information from said output device; means for storing said received updated status information in a cache;

UNITED STATES PATENT AND TRADEMARK OFFICE
CERTIFICATE OF CORRECTION

PATENT NO. : 6,636,891 B1
DATED : October 21, 2003
INVENTOR(S) : Gregory Leclair et al.

It is certified that error appears in the above-identified patent and that said Letters Patent is hereby corrected as shown below:

<u>Continuation from Column 18, lines 64 and 65,</u>
means for responding to a status request from said initiator by transmitting status information directly from said cache in response to the status request without communicating with said output device. --

Signed and Sealed this

Sixth Day of July, 2004

JON W. DUDAS
*Acting Director of the United States Patent and Trademark Office*